Dec. 2, 1952  R. HAGE  2,619,740
AERIAL NAVIGATION AID
Filed Sept. 24, 1948
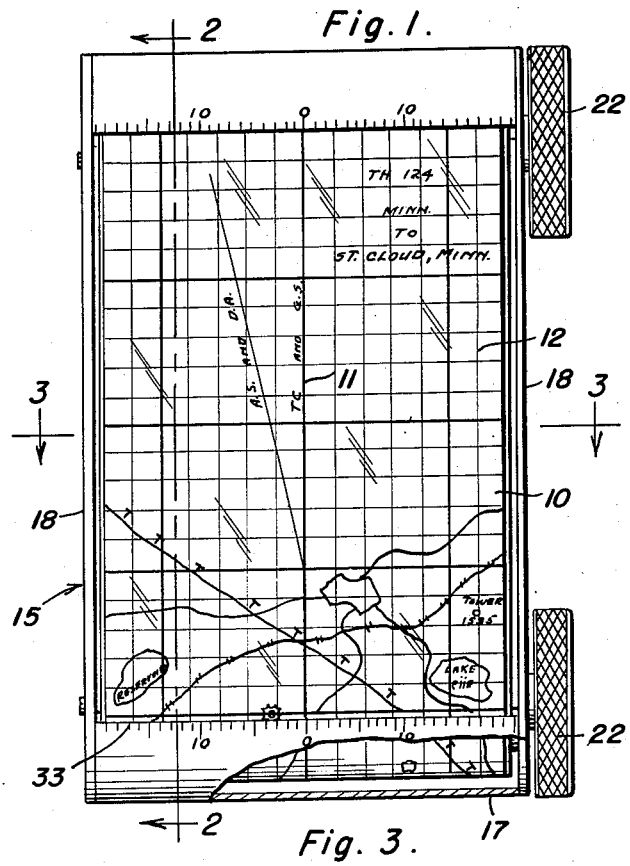
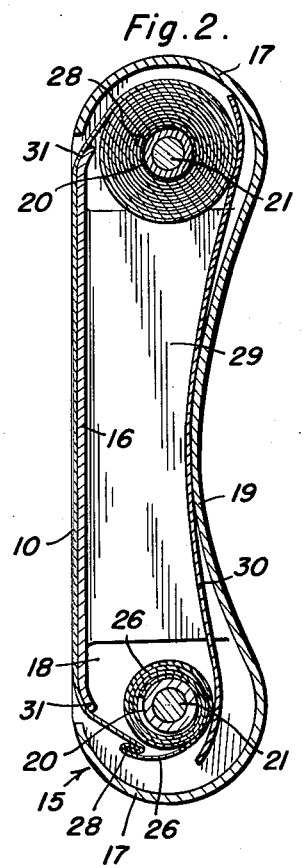
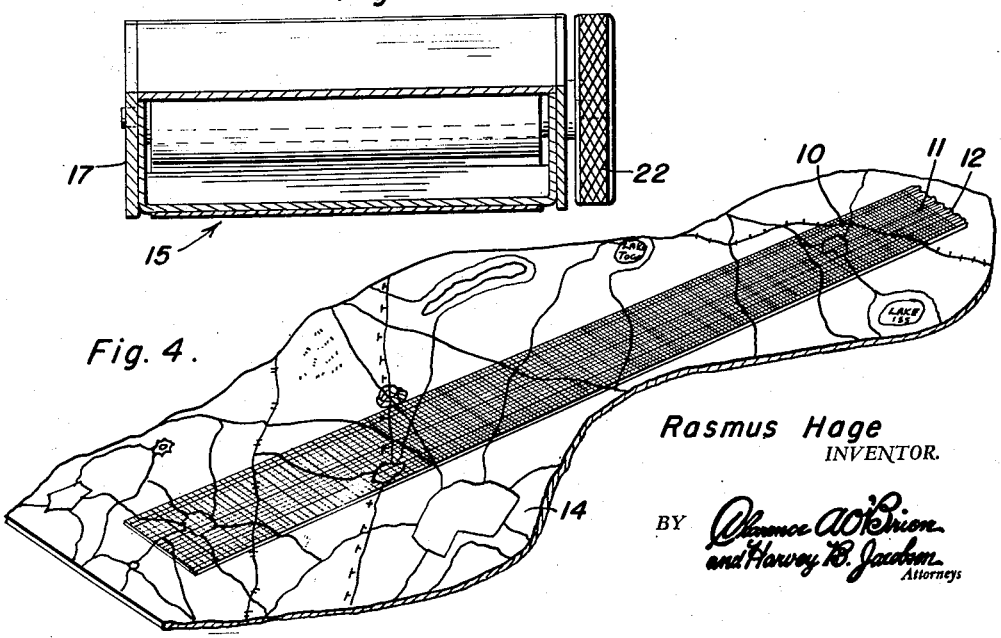
Rasmus Hage
INVENTOR.
BY Clarence A. O'Brien
and Harvey B. Jacobson
Attorneys Patented Dec. 2, 1952

2,619,740

UNITED STATES PATENT OFFICE 2,619,740

AERIAL NAVIGATION AID

Rasmus Hage, Warren, Minn.

Application September 24, 1948, Serial No. 50,911

1 Claim. (Cl. 35—40)

This invention relates to auxiliary appliances or aids for aerial navigation ("avigation") and it has for its primary or main object to provide means for reducing and simplifying the efforts which are connected with the navigation of a plane.

The proper and safe navigation of an airplane practically requires very frequently the undivided attention of a person. As the operation of the controls of the plane likewise practically engages almost permanently the undivided attention of a pilot it will be clear that it is extremely difficult for the pilot to take over the duties connected with navigation. Both duties require moreover long and expert training and cannot be performed by persons who are not sufficiently trained and experienced.

As the operation of the plane by more than one trained person is not always possible, it is necessary to provide aids or appliances relieving the pilot as far as possible from the strain due to double duties by the utmost simplification and reduction of the efforts connected with navigational duties. Further these aids or appliances are preferably so arranged that they can be used in the short intervals of time which the pilot can devote to them. They must therefore be in permanent readiness for use around the pilot's person or seat.

Terrestrial navigation is carried out by means of maps locating landmarks, by the compass and with the aid of constructions to be made, such as the speed triangle construction. Re-determination of all flight data is frequently necessary as the data available on ground may soon prove to be unreliable or to have changed. Therefore it is imperative that the pilot not only currently read maps and compass indications, but also should perform such constructions. All these operations take much more time if thoroughly performed than the pilot can with safety devote to them.

The invention consists in a system and in an appliance which permits to confine the navigational efforts to those extremely short pauses or intervals which the pilot can devote to them without leaving his seat or interrupting the permanent observation of the plane and of the controls. The main feature of the invention therefore consists in an appliance which may be carried either on the wrist or in one hand and which furnishes all the navigational data, especially if a compass is placed on it.

As maps on the proper scale cannot be prepared for such cases, a transparent strip is used according to the invention which is prepared by the pilot, is of the required small width, and also is provided with all the means necessary for orientation and navigational construction.

The strip itself contains a center line and a printed graduation, preferably related to the usual map scale. This strip is carried in a holder or case which permits to wind and unwind a considerable strip length, displaying only a small portion of it at a time. The case is of such small size that it may be strapped to the wrist or held in one hand. The preparation consists in laying the strip on the map between the first two points between which flight in a straight line takes place. Then the strip is placed over the next straight section or leg of the flight and again all the land marks from the map are copied, marking them on the strip. The pilot proceeds in the same way for all legs of the flight until the point of destination is reached. Likewise all notations such as emergency or auxiliary airports or landing strips etc. may be marked or noted if outside the area covered by the strip.

The strip therefore serves as a map and as a note or guiding book, but by means of its graduations and by further graduations applied on the case which may be related to those of the strip, the strip also serves as a base for the construction of flight data either before or during flight. The pilot thus has complete series of navigational data always at hand. He also has always the map data arranged on both sides of the center line which forms his true course.

The invention using this system has therefore for its primary object an aid or appliance for aerial navigation, including a transparent strip adapted to be prepared in the above described manner and means for housing, carrying and displaying the same.

A further object of the invention consists in providing an appliance for aerial navigation adapted to be carried on the wrist or in one hand which holds a portion of the strip always flatly extended on a removable table support.

A further object of the invention consists in providing an appliance for aerial navigation adapted to house, to display and to back or support a removable transparent strip, with a removable table or back plate against which the transparent strip is held and with means to wind and unwind the transparent strip said means preventing the strip from unwinding itself.

Further more specific objects of the invention will be apparent from the following detailed specification.

The invention is described in connection with one embodiment thereof shown in the drawing. It is to be understood however that this embodiment is shown by way of example only, in order to explain the principle of the invention and the best mode of applying this principle.

Other embodiments and modifications of the embodiment shown are not necessarily departures from the essence of the invention.

In the drawing:

Figure 1 is an elevational view of the navigational aid.

Figure 2 is a sectional elevational view, the section being taken along line 2—2 of Figure 1.

Figure 3 is a sectional plan view, the section being taken along line 3—3 of Figure 1.

Figure 4 is a fragmentary view of a map upon which a fragment of a transparent strip is laid in order to show the preparation of said strip.

The navigational aid is of such size that the pilot may carry it on his wrist or in one hand, so that it may be inspected or used without taking both hands off the controls and without diverting the attention from the observation of the craft and its surrounding for more than a few seconds. The appliance must be prepared individually by the pilot for a flight and the invention consists therefore in means permitting such individual preparation.

According to the invention a transparent or semi-transparent strip 10 of limited width is used carrying a central longitudinal line 11 indicative of the direction of flight and further having division lines 12 imprinted on it which may cross each other so as to form a pattern of division squares, each representing a given unit on the scale of the map used, such for instance as a mile or the like.

This transparent strip is laid out on a map 14 with the central longitudinal line 11 joining the points of departure and destination or intermediate points of the first leg of the flight between which a flight along a straight line is intended, and the principal landmarks, distances between points, etc. are copied from the map and are marked on the strip. The pilot then proceeds in the same manner for each following leg of the flight which—according to plan —is carried out in a straight line. All these straight line legs are arranged along the center line 11 of the strip. The strip thus prepared is then inserted into a case or holder 15 which is somewhat similar to a miniature map holder, and on which a portion of the strip 10 is kept extended on a plate or table 16 between rollers.

The case or holder 15 is preferably of such size that it may be strapped to the wrist of the pilot by one or more straps. It can thus be carried in a manner permitting permanent inspection without taking the hands from the controls. If not strapped to the wrist the case is small enough to be carried in the pocket and to be held in one hand, or to be placed somewhere in the cockpit for easy inspection.

The transverse edges or all edges surrounding the table plate 16 may be provided with graduations 33.

The case may or may not be provided with bails or means soldered to it (not shown) for passing wrist straps.

The case is preferably of elongated shape with a straight front side which is open so that a removable main plate or table 16 may be inserted which is carried by the case. It therefore consists of two half cylindrical end portions 17 joined by cheek plates 18, the upper ends of which are straight. The casing may be provided with a curved bottom 19 having its convex side turned inwardly for a purpose to be described.

In the two half cylindrical ends of the casing rollers 20 are arranged which are mounted on axles 21 the axis of which is coincident with the axis of the half cylindrical ends 17. The axles 21 may project outwardly on one side and on the projecting stub axles knurled or milled cylindrical disks 22 or hand wheels are mounted.

The flat main plate or table plate 16 is preferably removable and is held by friction so as to be aligned with the upper straight edges of the casing. It consists of the table plate proper which is provided at two sides with somewhat elastic wing plates 29 fitting in between the cheeks and of such size and shape that they may sit on the bottom plate when the table plate is in its position. The end portions of the plate may be curved or rounded as shown at 31. The function of the table 16 is to hold the visible portion of the strip extended and to serve as a backing, permitting the making of notes or the drawing of lines for navigational purposes. The strip 10 therefore runs over the main plate and is held in contact with it, but from there runs over the rounded edges of the table plate 16 towards the interior of the casing where it is taken up by two rollers 20.

The strip 10 is mounted on the two rollers by means of special attachment strips 26, which consists of a pliable metal foil retaining some elasticity. This attachment strip is wound around the roller so that several windings or layers are formed. Its end is bent or folded on itself as shown at 28. The end of the strip is likewise folded by the user and is inserted into the folded portion of the attachment strip which is thereby firmly held as soon as winding starts.

The attachment strips may be loose or may be inserted into narrow slits in the rollers.

The curved bottom 19 of the case serves as pivot for a leaf spring 30 which may or may not be attached to the convex portion and the ends of which is held under some elastic tension against the coiled attachment strips 26 and map strip 10 wound on the rollers. The leaf spring may consist of a curved somewhat elastic metallic foil approximately of the width of the rollers.

The increasing diameter of the scroll tends to push the leaf springs outwardly. But in any case the leaf spring produces a braking action as the increasing diameter on one side pushes the other side of the leaf spring resting on the scroll of diminishing diameter towards the latter and thus maintains a certain braking action opposing the unwinding and winding in every position which will be sufficient to keep the strip 10 flat and extended on and held against the back or table plate 16.

The use will be clear from the above description. The pilot when preparing the flight, takes the maps and maps his course between points, between which the flight is substantially a straight line. He then lays his transparent strip on the map in such a manner that the center line passes through the first pair of points above mentioned. He then copies from the map the landmarks and points which will furnish or facilitate orientation from the air. He then proceeds in the same manner for each pair of points between which the flight is planned in a straight line and aligns all these flight legs along the center line of the strip. He then attaches his strip 10 and winds the strip up, in such a manner that the first leg of his flight is visible. He proceeds as usual when determining true course, etc.

When in the air however he will soon note discrepancies due to deviations of the course from the one mapped. He may determine the deviation by putting a compass directly on the strip 10 and reading the angle between the needle and the center line 11. By comparison with his flight data as originally mapped he may now note the deviation and make a note on the strip.

In other cases it may be desirable to proceed again with the construction of the flight triangle which may be constructed directly on the strip as indicated in Figure 1. This will permit to obtain a corrected drift angle and by readjusting the heading accordingly the pilot may thus put the aircraft back on a true course corresponding with the center line of the strip.

Practically therefore observation and navigational operations may thus be carried out by the pilot without diverting his attention from the controls and visual observation of the craft and of the instruments for more than seconds.

It will thus be seen that in this way the problem of permitting a flight without a navigator is solved with a sufficient degree of safety.

It will be clear that the unessential parts may be replaced or changed without departing from the essence of the invention.

Having described the invention what is claimed as new is:

A navigational appliance, comprising a case, a transparent strip with a center line and with a printed graduation thereon, adapted to receive geographical map data, navigational notes and constructions made by the pilot, said case being open at the top and being provided with an inwardly curved bottom plate and with half cylindrical end portions with transverse edges in the top surface of the case, and with lateral cheek plates with straight top edges in the top surface, rollers mounted within said half cylindrical end portions, adapted to take up the said transparent strip and to wind and unwind it respectively, hand knobs attached to said rollers on the outside of the casing for rotating said rollers, a removable table plate insertable into the case and forming the top of the case when inserted, of a length substantially equal to the distance between the axles of the rollers, provided with lateral wing plates, fitting frictionally into the space between the cheek plates and shaped so as to be seated on the bottom plate, said wing plates holding the table plate when inserted into the open top of the case approximately flush with the top edges of the cheek plates in a position spaced from the edges of the half cylindrical end portion, said table plate supporting and backing a portion of the strip unreeled from one roller and reeled on the other roller, attachment strips consisting of elastic pliable metallic foils, each adapted to hold one of the ends of the transparent strip by folding the end of the pliable strip, over and together with said transparent strip, said attachment strips being coiled on the roller when the transparent strip is reeled, and a leaf spring, substantially of the width of the strip pivotally held on the convex portion of the bottom with its ends applied against the portions of the strips which are coiled on the rollers.

RASMUS HAGE.

REFERENCES CITED

The following references are of record in the file of this patent:

UNITED STATES PATENTS

| Number | Name | Date |
|---|---|---|
| 459,290 | Hoeft | Sept. 8, 1891 |
| 646,549 | Aberli | Apr. 3, 1900 |
| 770,350 | Carter | Sept. 20, 1904 |
| 853,042 | Thomson | May 7, 1907 |
| 1,642,580 | Erb | Sept. 13, 1927 |
| 1,818,757 | Samson | Aug. 11, 1931 |
| 2,119,943 | Marks | June 7, 1938 |
| 2,386,712 | Patterson | Oct. 9, 1945 |
| 2,403,197 | Schaller | July 2, 1946 |

FOREIGN PATENTS

| Number | Country | Date |
|---|---|---|
| 14,688 | Great Britain | 1896 |
| 464,804 | Great Britain | Apr. 26, 1937 |
| 520,865 | Great Britain | May 6, 1940 |
| 578,225 | France | June 26, 1924 |
| 821,104 | France | Aug. 17, 1937 |

OTHER REFERENCES

Roller Mounted Maps, Aviation Magazine, July 1946, page 74.